(12) United States Patent
Geise

(10) Patent No.: US 9,168,525 B2
(45) Date of Patent: Oct. 27, 2015

(54) METHOD FOR PRODUCING A FLUIDIC DEVICE

(75) Inventor: Stephan Geise, Ruethen (DE)

(73) Assignee: Robert Bosch GmbH, Stuttgart (DE)

( * ) Notice: Subject to any disclaimer, the term of this patent is extended or adjusted under 35 U.S.C. 154(b) by 165 days.

(21) Appl. No.: 13/825,573

(22) PCT Filed: Sep. 9, 2011

(86) PCT No.: PCT/EP2011/065653
§ 371 (c)(1),
(2), (4) Date: Jun. 11, 2013

(87) PCT Pub. No.: WO2012/038275
PCT Pub. Date: Mar. 29, 2012

(65) Prior Publication Data
US 2014/0147347 A1    May 29, 2014

(30) Foreign Application Priority Data

Sep. 23, 2010 (DE) .................. 10 2010 041 287

(51) Int. Cl.
| | |
|---|---|
| G01N 15/06 | (2006.01) |
| G01N 33/00 | (2006.01) |
| G01N 33/48 | (2006.01) |
| B01L 3/00 | (2006.01) |
| B29C 45/16 | (2006.01) |
| B29D 22/00 | (2006.01) |
| B29C 45/17 | (2006.01) |
| B29C 45/56 | (2006.01) |
| B29C 45/14 | (2006.01) |

(52) U.S. Cl.
CPC ....... *B01L 3/502707* (2013.01); *B29C 45/1657* (2013.01); *B29C 45/1671* (2013.01); *B29D 22/00* (2013.01); *B01L 3/50273* (2013.01); *B01L 2200/0689* (2013.01); *B01L 2300/0816* (2013.01); *B29C 45/1701* (2013.01); *B29C 45/561* (2013.01); *B29C 2045/14327* (2013.01); *B29C 2045/1662* (2013.01)

(58) Field of Classification Search
USPC ............. 422/50, 68.1, 502, 503, 504; 29/592, 29/592.1
See application file for complete search history.

(56) References Cited

FOREIGN PATENT DOCUMENTS

WO    2006/098817 A1    9/2006

OTHER PUBLICATIONS

International Search Report corresponding to PCT Application No. PCT/EP2011/065653, mailed Feb. 24, 2012 (German and English language document) (7 pages).

*Primary Examiner* — Brian J Sines
(74) *Attorney, Agent, or Firm* — Maginot, Moore & Beck LLP

(57) ABSTRACT

A method for producing a microfluidic device includes: a) forming a carrier plate in an injection compression molding tool; b) arranging at least one functional element on one side of the carrier plate; c) forming a cover plate in an injection compression molding tool, wherein the injection compression molding tool is the same or different than that used to form the carrier plate; and d) arranging the cover plate on the carrier plate to cover the at least one functional element and to seal the fluidic device in an airtight manner.

12 Claims, 3 Drawing Sheets

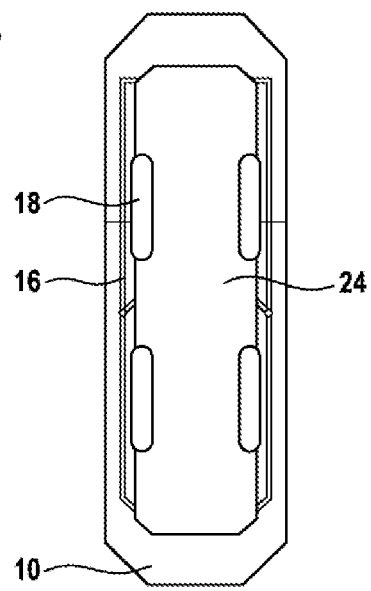
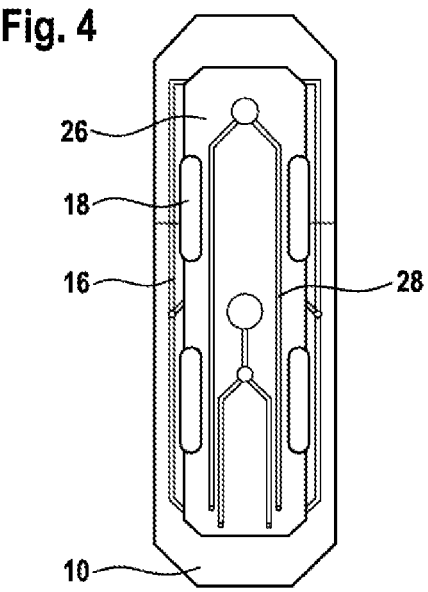

METHOD FOR PRODUCING A FLUIDIC DEVICE

This application is a 35 U.S.C. §371 National Stage Application of PCT/EP2011/065653, filed on Sep. 9, 2011, which claims the benefit of priority to Serial No. DE 10 2010 041 287.2, filed on Sep. 23, 2010 in Germany, the disclosures of which are incorporated herein by reference in their entirety.

The present disclosure relates to a method for producing a fluidic device. The present disclosure relates, in particular, to a method for producing a media-authentic microfluidic device for analytical, preparative or medical applications.

BACKGROUND

For various fields of application, such as for medical analysis, for example, fluidic devices formed from plastic, such as microfluidic chips or analysis chips, for instance, are usually produced nowadays. These can be used for so-called lab-on-chip systems, for example. In this case, the different analysis chips can comprise a structured plastic carrier plate, an intermediate plate and a cover plate. In this case, the required analysis components or pumps, heat sources and sensors are integrated. The different plastic components are produced separately on a plurality of injection-molding machines in each case in specific molds for injection-molding.

In the case of medical products it is often of elementary importance for the components to be sterile. In this way, it is possible to ensure that the later analysis results are not corrupted by inadvertently introduced contaminants. For this reason, all components of the microfluidic chip are produced and packaged under clean room conditions. The components from the different manufacturing areas are subsequently brought together for further assembly. In order to obtain a media-authentic system in a subsequent assembly step, the equipped carrier plates are connected to intermediate plates and the cover plates in a laser welding process. In this case, the weld seams have to run at a sufficient distance from the analysis components in order that the latter do not incur damage as a result of the high evolution of heat.

SUMMARY

The present disclosure relates to a method for producing a fluidic, in particular microfluidic, device, comprising the following steps:
a) shaping an, in particular structured, carrier plate in a mold for injection-compression molding,
b) arranging at least one functional element, such as, in particular, an intermediate plate, an analysis component or a pump element on one side of the carrier plate,
c) shaping a cover plate in a mold for injection-compression molding, wherein the mold for injection-compression molding can be the same as or a different one than in step a),
d) arranging the cover plate on the carrier plate for covering the at least one functional element and for sealing the fluidic device in an airtight manner.

The method according to the disclosure for producing a fluidic device is based on the principle of two-component injection-compression molding. In the context of the disclosure, injection-compression molding is understood to mean that a plastic melt in the form of a cake of material is injected into a substantially unpressurized and still partly open mold. The mold is fully closed only during the solidification process of the component to be produced. As a result, a uniform closing pressure builds up, which provides for the final shaping of the component. What is characteristic of two-component injection-compression molding is that two types of plastic are joined together in an injection-molding machine comprising a mold for injection-compression molding.

By using a two-component injection-compression molding process, the method according to the disclosure is particularly well suited to producing microfluidic devices, since, according to the disclosure, even very small components can be molded with a high accuracy. Furthermore, the work sequence is readily programmable such that even volumes on the scale of mass production are possible. Furthermore, the respective curing characteristic is readily adaptable, such that fluidic devices having precisely defined properties, such as hardness, for instance, can be produced.

Furthermore, for all plastics used, injection-compression molding yields very good surface properties and furthermore a low mechanical anisotropy.

Such a method affords the advantage that the fluidic device can be manufactured with significantly smaller dimensions. This is because the evolution of heat that occurs during injection-compression molding is significantly less than the heat that occurs in conventional production methods. It is thus possible to dispense, in particular, with joining together the individual components, such as, in particular, the carrier plate with the cover plate, in a highly heat-intensive manner, which usually involves producing weld seams by using laser beams. The conventionally required distance between the heat-sensitive functional elements, such as, in particular, analysis components or membranes, and the weld seam can thus be obviated. Furthermore, by virtue of the fact that no excessive evolution of heat occurs in the method according to the disclosure, the incorporation of complex and heat-sensitive functional elements, such as analysis components, for instance, is also possible without any problems.

As a result of using a two-component injection-compression molding technique, the fluidic device can furthermore be produced substantially in one manufacturing step. As a result, the method according to the disclosure can be implemented in a particularly time-saving and cost-effective manner. Furthermore, the outlay on apparatus is greatly limited. Essentially only a two-component injection-molding machine, a mold for two-component injection molding or mold for two-component injection-compression molding and a corresponding handling system are required. An additional assembly step by means of laser welding is not required. Costs in respective of manufacturing and storage times, transports, additional tools and machines are thus saved.

In this case, the carrier plate can preferably be embodied in a structured fashion. In the context of the disclosure, structured means here that the carrier plate has at least one structure, but advantageously a multiplicity of structures, which can be used in the further method for arrangement and/or fixing or for desired working of at least one functional element. In this case, a functional element in the context of the disclosure can encompass any component which imparts a function to the fluidic connection produced. By way of example, the functional element can encompass an analysis component, a membrane, or else an intermediate plate, one or a plurality of functional elements being possible. Exemplary structures are therefore, for example, channels in which a fluid can flow, or else receptacles for desired positioning of the at least one functional element.

According to the disclosure, a fluidic device in this case means that at least one work step with at least one fluid is possible with the device. In this case, a microfluidic device is one which is dimensioned in at least one dimension in a range of from a few to several 100 µm, in particular ≤1 mm.

In the context of one advantageous configuration of the method according to the disclosure, the method is carried out in a clean room. This configuration allows a fluidic device to be produced wherein no germs or dirt particles that might influence the analysis result or other areas of application of the fluidic device pass into the system. According to the disclosure, therefore, the entire method for producing the fluidic connection can be carried out in a clean room, wherein a fluidic device sealed in an airtight manner arises. This obviates the labor outlay for manufacturing all the different components, such as, in particular, the carrier plate, the intermediate plate and the cover plate, in mutually independent work steps and subsequently joining them together in a clean room. According to the disclosure, a clean room is in this case a volume in which germs or dirt particles are present in an extremely low concentration. Particularly preferably, a clean room of class ISO 7 (according to ISO 14644-1) is used.

In the context of a further advantageous configuration of the method according to the disclosure, the carrier plate is shaped from a transparent plastic. As a result, the interior of the fluidic device is visible at least on one side. This is advantageous particularly when an analysis component whose analyses or data should be visible from outside the fluidic device is arranged in the fluidic device.

Particularly in the case where the carrier plate is embodied with a transparent plastic, it is advantageous if the carrier plate is shaped from a cycloolefin polymer. Such polymers have properties particularly suitable for the production and use of fluidic devices. By way of example, the so-called cycloolefin copolymers are particularly suitable. They are amorphous and thus transparent, in contrast to the partly crystalline polyolefins. Their properties can be adapted to the desired application in a wide range. In particular, it is possible to adapt the heat distortion resistance in a wide temperature range, which enables the method according to the disclosure to be carried out even at low temperatures, as a result of which temperature-susceptible components, such as, in particular functional elements, can be protected. Furthermore, cycloolefin polymers are distinguished by a series of further advantageous properties, such as, for instance, good thermoplastic flowability, high stiffness, strength and hardness and low density in conjunction with good resistance to acids and alkaline solutions. This is advantageous particularly for applications in the microfluidic field, for example as an analysis chip.

In the context of a further advantageous configuration of the method according to the disclosure, the cover plate is shaped from a cycloolefin polymer or from polyphenylene sulfide (PPS), in particular with a mineral filler. In the case where the cover plate is formed from a cycloolefin polymer, the abovementioned advantages can also be obtained in the case of the cover plate. Polyphenylene sulfide is furthermore a particularly resistant polymer whose good mechanical properties are also maintained at temperatures far above 200° C. Also outstanding is the chemical resistance of polyphenylene sulfide toward virtually all solvents, many acids and alkaline solutions and also to a limited extent toward atmospheric oxygen even at high temperatures. Polyphenylene sulfide furthermore exhibits not only low water absorption but also good dimensional stability and inherent non-flammability. It has good insulation properties, is highly impermeable to most liquids and gases and has only a minor tendency to creepage even at relatively high temperatures. Furthermore, on account of its good flowability it is also suitable for long, narrow shaped parts and complex mold geometries. By means of the fillers, the properties can in this case be adapted to the desired application. Suitable fillers comprise, for example, glass fibers, glass beads or mineral fillers such as quartz sand or chalk.

It is furthermore advantageous that after the process of shaping the carrier plate, the latter is at least partly treated using a plasma. A plasma treatment makes it possible firstly to clean the surface of the carrier plate and secondly to activate the surface. In this way, a particularly stable connection between the carrier plate and the cover plate can be obtained, thereby virtually precluding damage as a result of undesired opening of this connection. As a result, the fluidic device can be reliably protected against ingress of germs or other contaminants.

In the context of a further advantageous configuration of the method according to the disclosure, an undercut for engaging a lug of the cover plate is formed on the carrier plate. The connection of carrier plate and cover plate becomes even more stable as a result. A connection is thus realized not only by the adhesion of the plastics to one another, but also by a mechanical fixing means that allows a positively locking connection between carrier plate and cover plate. In this case, the undercut is preferably formed directly during the process of shaping the carrier plate.

In a further advantageous configuration of the method according to the disclosure, the at least one functional element is held in position by at least one web at least at times during production. This prevents the functional element from slipping during the production method and the device produced becoming unusable as a result. In this case, the holding in position can be supported by some other fixing of the functional element. It is therefore not mandatory for the functional element to be held in position only or principally by the webs; additional adhesive bonding or other fixing is also possible in the context of the disclosure. This configuration is advantageous particularly in the case where an intermediate plate is provided as a functional element.

In the context of a further advantageous configuration of the method according to the disclosure, the fluidic device is selected from an, in particular microfluidic, analytical or preparative device, such as, for instance, for examining blood (sepsis) or examining urine (cystitis).

The disclosure furthermore relates to a fluidic, in particular microfluidic, device, comprising an, in particular structured, carrier plate, on which at least one functional element, such as, in particular, an intermediate plate, an analysis component or a pump element, is arranged, wherein the at least one functional element is covered by a cover plate, which seals the fluidic device in an airtight manner, and wherein the carrier plate has an undercut, into which a lug of the cover plate engages.

Further advantages and advantageous configurations of the subjects according to the disclosure are illustrated by the drawings and explained in the description below.

BRIEF DESCRIPTION OF THE DRAWINGS

In this case, it should be taken into consideration that the drawings are merely descriptive in character and are not intended to restrict the disclosure in any form. In the figures:

FIG. 3 shows a schematic view from above of a carrier plate of a membrane arranged thereon;

FIG. 4 shows a schematic view from above of a carrier plate of an intermediate plate arranged thereon;

DETAILED DESCRIPTION

The method according to the disclosure is described in an exemplary and non-limiting manner in FIGS. 1 to 6. In this case, the same reference signs are used for corresponding structural parts or components in the figures.

Figure 1:
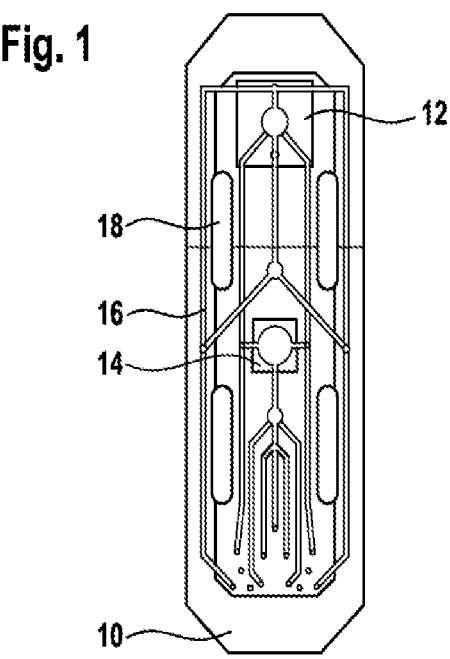
FIG. 1 shows a schematic view of a structured carrier plate from above.
Figure 2:
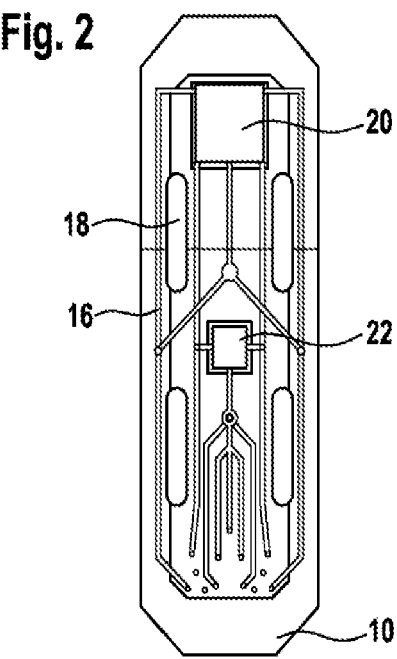
FIG. 2 shows a schematic view from above of a carrier plate with analysis component and pump element arranged thereon.

FIG. 1 shows a carrier plate 10 that can be part of a fluidic, in particular a microfluidic, device. In accordance with the method according to the disclosure, in a first step said carrier plate 10 is shaped in an injection-molding machine in a mold for injection-compression molding. For this purpose, an injection unit can inject a plastic into a mold, or into a mold for injection-compression molding. In this case, the plastic used is preferably a transparent plastic, such as, for instance, a cycloolefin polymer (COP). The carrier plate 10 can be shaped by the action of a structured compression ram into the mold. A compression pressure of ≤200 bar is particularly preferred for this purpose. In this case, the carrier plate 10 can be shaped with little distortion, that is to say dimensionally stably. A film gate that forms can subsequently be cut off and removed from the injection-molding machine or from the mold for injection-compression molding.

In this case, the mold and/or the ram of the injection-molding machine are/is preferably shaped in such a way that the carrier plate 10 produced is structured, that is to say has structures for the desired function of the fluidic device to be produced. Said structures can comprise, for example, a receptacle 12 for an analysis component, such as a sensor, for instance, or a receptacle 14 for a component of a pump, as is shown with reference to FIG. 2. Moreover, further receptacles are conceivable for further functional elements to be arranged in the fluidic device. Furthermore the structures can comprise a channel system 16, in which the fluid can be guided during the operation of the fluidic device.

Furthermore, an undercut 34 can be formed, in particular during the process of shaping or structuring the carrier plate 10, which undercut can be engaged by a cover plate 30 in the later course of the method, as can be discerned with reference to FIG. 6. This is possible by virtue of the provision of at least one, preferably a plurality of webs 18. The web 18 can be part of the mold for injection-compression molding and can therefore form a cutout in the carrier plate 10. The at least one web 18 can be initially maintained in further method steps in order to provide for increased stability during the arrangement of further functional elements.

In a next step, the surface of the shaped and advantageously structured carrier plate 10 can be treated using a plasma. For this purpose, a plasma gun can aim into the open mold and thus enable a plasma to act on the surface of the carrier plate 10. The surface of the carrier plate 10 can be cleaned and activated in this way. In the completed fluidic connection, this step improves the adhesion of a cover plate 30 to the carrier plate 10 and thus the stability of the fluidic device as such.

Subsequently, for example by means of a handling system, various functional elements can be arranged on the carrier plate 10 and, if appropriated, fixed there. Exemplary functional elements comprise an analysis component 20, such as a sensor, for instance, or a pump element 22, as can be discerned in FIG. 2. Fixing of the functional elements can be realized by providing a suitable adhesive, for example.

In a next step, as further functional element, a pump membrane 24 can be arranged on the carrier plate 10, as is shown in FIG. 3. In this case, the pump membrane 24 serves for conveying a fluid to be treated in the fluidic device and is expediently expandable. In this case, the pump membrane 24 can be formed from a thermoplastic elastomer (TPE), a thermoplastic polyurethane (TPU), a thermoplastic vulcanizate (TPV) or else a thermosetting elastomer.

Expediently, as further functional element, an intermediate plate 26, also designated as control plate, is subsequently arranged above the pump membrane 24, in accordance with FIG. 4. In this case, the intermediate plate 26 is preferably structured at its underside, the structures 28 being indicated schematically in FIG. 4. In this case, the structures 28 are expediently adapted to the structures of the channel system 16 in such a way that the pump membrane 24 can at least partly move into these structures 28 during a conveying process, for instance as a result of a vacuum being applied. A pump system that is well suited to a fluidic system is provided in this way.

The intermediate plate 26 in turn can be produced in another injection-compression molding process carried out in the injection-molding machine in a mold for injection-compression molding. The intermediate plate is advantageously molded from a cost-effective plastic having little distortion. Particularly preferred plastics from which the intermediate plate 26 can be molded comprise, for example, polyphenylene sulfide, in particular with a mineral filler, such as quartz sand or chalk, for instance.

In the above mentioned steps of the method according to the disclosure, the at least one web 18 can advantageously be arranged in the mold in order to stabilize the applied functional elements. For the next method step, the at least one web 18 is removed from the mold.

Figure 5:
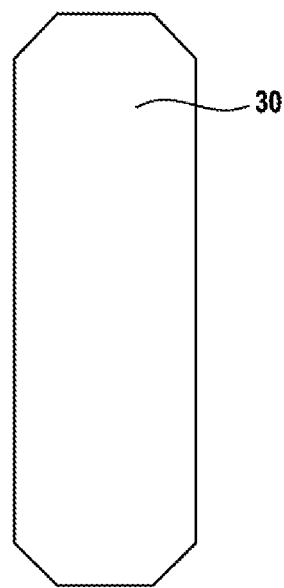
FIG. 5 shows a schematic view of a completed fluidic device from above.
Figure 6:
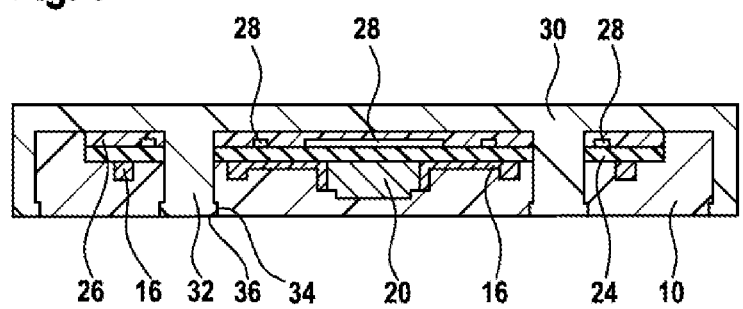
FIG. 6 shows a schematic sectional view of a completed fluidic device from the side.

The mold for injection-compression molding in the injection-molding machine can then be closed and a further plastic can be injected into the mold in order to shape a cover plate 30, as is shown in FIGS. 5 and 6. For this purpose, the injected plastic preferably comprises a cycloolefin copolymer or else polyphenylene sulfide, in particular with one or more mineral fillers. In this case, the mineral fillers can comprise glass fibers, glass beads or mineral fillers such as quartz sand or chalk.

Once this plastic has been injected into the mold, a preferably planar ram is pressed into the mold, thereby compressing the second plastic onto the carrier plate 10. A cover plate 30 is shaped in the process by virtue of the configuration of the mold and of the compression ram. The film gate produced can thereupon be removed. The plasma treatment of the surface of the carrier plate 10 carried out in an earlier step gives rise to a good support of the cover plate 30 on the carrier plate 10, such that the fluidic device produced becomes very stable.

If, as described with reference to FIG. 1, a web 18 or a plurality of webs 18 was/were used, said web(s), as already explained, was/were removed prior to the process of shaping the cover plate 30. This cavity is subsequently filled by a holding region 32 of the cover plate 30. This can be discerned in FIG. 6. As a result of a suitable structuring of carrier plate 10 and cover plate 30, the carrier plate 10 has an undercut 34, into which engages a lug 36 of the cover plate 30 for fixing the cover plate 30 to the carrier plate 10 in a positively locking manner. In this case, the size, shape and geometry of the undercut 34 and/or of the lug 36 are dependent on the corresponding mold and/or ram of the injection-compression molding machine in which the carrier plate 10 and the cover plate 30 are shaped.

Particularly preferably, the method according to the disclosure is carried out completely under clean room conditions. For this purpose, by way of example, the two-component injection-molding machine or the mold for injection-compression molding and the handling system can be completely integrated in a clean room. In this case, the method according to the disclosure is particularly well suited to producing microfluidic devices for high-precision analytical, preparative or medical applications.

The invention claimed is:

1. A method for producing a fluidic device, comprising:
    shaping a carrier plate in a mold configured for use in injection-compression molding;
    forming an undercut on the carrier plate;
    arranging at least one functional element on a first side of the carrier plate;
    shaping a cover plate in a mold configured for use in injection-compression molding, wherein the mold of the cover plate is one of the same as the mold of the carrier plate and different than the mold of the carrier plate;
    forming a lug on the cover plate; and
    arranging the cover plate on the carrier plate to cover the at least one functional element and to seal the fluidic device in an airtight manner,
    wherein the undercut is configured to engage the lug.

2. The method as claimed in claim 1, wherein the method is carried out in a clean room.

3. The method as claimed in claim 1, wherein the carrier plate is shaped from a transparent plastic.

4. The method as claimed in claim 1, wherein the carrier plate is shaped from a cycloolefin polymer.

5. The method as claimed in claim 1, wherein the cover plate is shaped from one of a cycloolefin polymer and a polyphenylene sulfide.

6. The method as claimed in claim 1, further comprising at least partly treating the carrier plate using a plasma after shaping the carrier plate.

7. The method as claimed in claim 1, further comprising holding the at least one functional element in position with at least one web at least at times during production.

8. The method as claimed in claim 1, further comprising selecting the fluidic device from an analytical device and a preparative device.

9. The method as claimed in claim 1, wherein the undercut is formed in a second side of the carrier plate.

10. The method as claimed in claim 9, wherein:
    the second side of the carrier plate is arranged opposite the first side of the carrier plate, and
    arranging the cover plate includes arranging the cover plate in direct contact with the first side and the second side of the carrier plate.

11. The method as claimed in claim 7, further comprising removing the at least one web prior to shaping the cover plate so as to form at least one cavity.

12. The method as claimed in claim 11, wherein shaping the cover plate includes filling the at least one cavity with a holding region of the cover plate.

* * * * *